United States Patent
Sabaa et al.

(10) Patent No.: US 8,050,261 B2
(45) Date of Patent: Nov. 1, 2011

(54) METHOD AND APPARATUS FOR FRAME REDIRECTION IN A STORAGE AREA NETWORK ENVIRONMENT

(75) Inventors: Amr Sabaa, Sunnyvale, CA (US); Bao Vu, San Lorenzo, CA (US); Tarak Parekh, San Jose, CA (US); Lucy Yan, Fremont, CA (US); Qingyuan Ma, Saratoga, CA (US); Ketan Shah, San Jose, CA (US); Richard L Hammons, Hollister, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 539 days.

(21) Appl. No.: 12/140,898

(22) Filed: Jun. 17, 2008

(65) Prior Publication Data

US 2009/0313415 A1 Dec. 17, 2009

(51) Int. Cl.
H04L 12/28 (2006.01)
H04L 12/56 (2006.01)
(52) U.S. Cl. .......................................... 370/389; 711/6
(58) Field of Classification Search ........................ None
See application file for complete search history.

(56) References Cited

U.S. PATENT DOCUMENTS

| 7,484,055 | B1* | 1/2009 | Gupta et al. ................... 711/156 |
| 7,864,758 | B1* | 1/2011 | Lolayekar et al. ............. 370/389 |
| 2002/0087751 | A1* | 7/2002 | Chong, Jr. ....................... 710/33 |
| 2006/0220533 | A1* | 10/2006 | Achiwa et al. ................ 313/504 |
| 2008/0114961 | A1* | 5/2008 | Ramaswamy et al. ........ 711/170 |

* cited by examiner

*Primary Examiner* — Chirag Shah
*Assistant Examiner* — Minh-Trang Nguyen
(74) *Attorney, Agent, or Firm* — Wong, Cabello, Lutsch, Rutherford & Brucculeri LLP

(57) ABSTRACT

Embodiments according to the invention relate to frame redirection, which includes methods to intercept and re-route traffic between an initiator and a target. When a frame is redirected, an initiator issues a frame to the target, but the frame is received by a virtual target in a redirection switch by allowing the redirection switch to use the WWN of the actual target. From the perspective of the initiator, the target resides on the redirection switch. From the redirection switch, the frame is sent to the actual target by allowing the redirection switch to use the identity of the initiator. In other words, the redirection switch presents the WWN of the initiator to the target when the redirected frame is sent to the target. From the perspective of the target, the frame is received as if it originated at the initiator.

31 Claims, 8 Drawing Sheets

METHOD AND APPARATUS FOR FRAME REDIRECTION IN A STORAGE AREA NETWORK ENVIRONMENT

BACKGROUND OF THE INVENTION

1. Field of the Invention

Embodiments according to the invention relate to a method and apparatus for frame redirection in a Storage Area Network (SAN) environment. More particularly, embodiments according to the invention relate to frame redirection, which includes methods to intercept and re-route traffic between an initiator and a target.

This application is related to U.S. patent application Ser. No. 10/695,408, the contents of which are incorporated by reference.

2. Description of the Related Art

Effectively deploying multiple devices in a network environment becomes an increasingly complex task as transmission data rates, processor speeds, and storage capacities increase. Storage area networks (SANs) have been developed as specialized high-speed networks, referred to as fabrics, to connect computer systems, control software, and storage devices over the fabric. A SAN typically allows block level input/output (I/O) rather than file-level access. Thus, every device connected to a SAN fabric appears as a locally attached device to other devices on the fabric.

FIG. 1A shows components in a fabric 102. The fabric 102 includes a host 104, a Fibre Channel switch 107, and one or more storage devices 120a, 120b. Each host 104 and storage device 120 may be one of a number of specific devices. The host 104 may be, for example, a server, while the storage devices 120a, 120b may be RAID devices, which in turn may be logically separated into logical units. Alternatively the storage devices 120a, 120b could be a JBOD ("just a bunch of disks") device, with each individual disk being a logical unit.

A SAN allows for relatively simple interchangeability of components with minimal disruptions to other components, as discussed above. However, as the size of a SAN increases (and correspondingly, storage needs on the SAN increase), it becomes beneficial to merge resources such as storage devices 120a, 120b into single logical devices, making it easier for hosts 104 to access the storage devices 120a, 120b. One such method of merging resources is addressed through virtualization. In general terms, virtualization is a process used to collect storage resources into a pool and hand out logical slices to hosts, without any reconfiguration on the host side or on the storage side. Then, through modifications to the host 104, switch 107, or storage devices 120a, 120b (or some combination thereof), traffic intended to pass from an initiator (e.g., host 104) to a target (e.g., storage device 120a) is re-routed to a "virtual" target and on to the defined physical target or targets.

Storage virtualization provides to computer systems a separate, independent view of storage from the actual physical storage. A computer system (e.g., a host) sees a virtual disk. As far as the host is concerned, this virtual disk appears to be an ordinary SCSI disk logical unit. However, this virtual disk does not exist in any physical sense as a real disk drive or as a logical unit presented by an array controller. Instead, the storage for the virtual disk is taken from portions of one or more logical units available for virtualization (the storage pool). This separation of the hosts' view of disks from the physical storage allows the host's view and the physical storage components to be managed independently from each other. For example, from the host perspective, a virtual disk's size can be changed (assuming the host supports this change), its redundancy (RAID) attributes can be changed, and the physical logical units that store the virtual disk's data can be changed, without the need to manage any physical components. These changes can be made while the virtual disk is online and available to hosts. Similarly, physical storage components can be added, removed, and managed without any need to manage the hosts' view of virtual disks and without taking any data offline.

Numerous implementations for virtualization exist. For example, logical unit number (LUN) masking may be employed to prevent each host from accessing storage resources that it is not permitted to use. In general terms, LUN masking makes particular LUNs available to some hosts, but unavailable to others. LUN masking filters are typically installed as specialty software (e.g., a device driver) on each host. Although this software may be configured from a centralized management application, ultimately, each host is responsible for maintaining a proper configuration for LUN masking.

Other methods for virtualization exist. For example, specialized devices may be used "in-band," between hosts and storage devices, to provide virtualized storage to the hosts. One example of a fabric enabled for in-band storage virtualization, i.e., routing network traffic from a host 104 to a storage device 120a, 120b via a Fibre Channel switch 107, is shown in FIG. 1B. As shown in FIG. 1B, a host 104 has, among other elements, a host bus adapter (HBA) 106. Conventionally, the HBA 106 is a daughter board connected to the host 104. Each HBA connects a host 104 to other network and storage devices 120a, 120b on the fabric 102 via the Fibre Channel switch 107. As is known in the art, each HBA 106 has a World Wide Name (WWN), which is a unique identifier assigned to each Fibre Channel device. A WWN identifies the HBA 106, and thus the respective host 104, to the Fibre Channel switch 107 and other devices on the fabric 102. The storage devices 120a, 120b also have unique WWNs. On the switch 107 side, each device is connected to a particular port, and is identified by a port identifier (PID). The PID identifies the physical switch and the port to which each network device is attached. As a PID is dependent on the switch, a PID may change in certain situations.

The Fibre Channel switch 107 includes a virtualization processor 108, and a name server 109, which stores information about all devices in the fabric 102. Typically, a name server 109 operates on each Fibre Channel switch in the fabric 102. The virtualization processor 108 creates virtual devices 114, 116 to interface between the host 104 and the physical storage 120a, 120b. Virtualization of SAN devices accelerates replacement of storage devices 120a, 120b and HBAs. SAN devices can be virtualized as initiators or targets to create virtual targets or virtual initiators. The logical units of the virtual target 114 correspond to volumes as defined by the volume manager 112. The first and second virtual logic units 118, 119 map to the physical storage devices 120a, 120b, respectively. The virtual target 114 appears as a normal Fibre Channel Protocol (FCP) device to the host 104. The host 104 discovers the virtual target 114 through a fabric directory service.

Virtualization may best be understood by of describing an example frame intended to pass from the host 104 (i.e., the initiator) to the storage device 120a (the target), using a translation operation (such as data mirroring) to back up the data on the storage device 120b. In this process, the initiator (host 104) issues a command to a virtual target 114, which is located in the switch 107. The virtual target 114, known to the initiator, has a different WWN than the actual target (storage device 120a). The switch 107 then applies storage application logic to perform mirroring. Thus, the command is sent to the storage device 120*a*, and a copy of the command is sent to the storage device 120*b*. In addition to mirroring, many data services are available in a fabric 102, including, for example, migration, snapshot, replication, and journaling. These translation services are discussed more fully in U.S. patent application Ser. No. 10/695,408, the contents of which are incorporated by reference. However, the proper execution of such services requires that each device knows all available devices on the SAN. However, adding, removing, or changing a device on a fabric requires the host and the target in a fabric to perform a fabric login and re-learn all devices (i.e., the PIDs and WWNs of the devices) on the fabric.

For example, when a device (e.g., host 104) is connected to the Fibre Channel switch 107, it performs an initialization process known as a fabric login. In this process, the switch 107 registers the WWN of the device with the name server 110, which generates a unique PID for the device. As mentioned above, the PID describes the location of the device in relation to the switch 107 in the SAN with information such as the switch and switch port that the device is connected to. Initialized devices that are initiators attempt to log in to other devices on the SAN to find out what they are and to create proper connections to the devices. This learning is performed by querying the name server 110 in the switch 107 to receive the PID and WWN of each device. Further, when a device connects to or disconnects from a fabric, the switch 107 sends registered state change notifications (RSCNs) to the devices that have registered to receive them.

Conventionally, inserting a virtual target with its own WWN between an existing host and a physical target requires the host to break the existing connection and re-scan to find the new virtual target with its WWN. While this re-scanning is troublesome, and desirable to be removed, a larger problem is that both fabric zoning and access control lists (ACLs) maintained by various entities also have to be changed. Fabric zoning is complicated and being required to change it to allow use of the virtual target is burdensome. Changing the ACLs is even more burdensome as it requires administrator operations on each of the affected devices. Thus, insertion of a virtual target is a burdensome task and alleviating the effect is desirable. Although advances in Fibre Channel standards have helped make these processes less disruptive to a SAN, network designers are continuously seeking new ways to increase storage space, processing capabilities, and data transmission rates, while decreasing "downtime" periods on a fabric 102.

SUMMARY OF THE INVENTION

One or more embodiments according to the invention relate to frame redirection, which includes methods to intercept and re-route traffic between an initiator and a target. If frame redirection is used for a particular frame, an initiator of the frame issues the frame to the target. However, the frame is received by a virtual target in a redirection switch, rather than the intended target. This is accomplished by allowing the redirection switch to present the virtual target to the initiator as if it were the actual target (i.e., rather than using the port identifier of the actual target, the redirection switch presents the port identifier of the virtual target to the initiator) and use the WWN of the actual target. From the perspective of the initiator, the target resides on the redirection switch, its address simply having been changed, which is a common occurrence in a Fibre Channel fabric. Although the initiator believes it is sending a frame directly to the intended target, it is actually sending the frame to a virtual target in the redirection switch.

From the redirection switch, the frame is sent to the actual target by allowing the redirection switch to use the identity of the initiator. In other words, the redirection switch presents the WWN of the initiator to the target. Thus, the target receives the frame believing that the frame originated at the initiator, though again at a different address. Such redirection prevents the need to re-scan for devices, to change access control lists or to restructure zoning in a fabric, for example, when a device is changed in the fabric.

DETAILED DESCRIPTION

Reference will now be made in detail to several embodiments of the invention, examples of which are illustrated in the accompanying drawings. Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment. Wherever practicable, the same reference numbers will be used throughout the drawings to refer to the same or like parts.

As mentioned briefly above, frame redirection occurs by using a redirection switch to re-route a frame intended to pass from an initiator to a target. Instead of allowing the frame to pass directly to the target, the redirection switch intercepts the frame by creating a virtual target that uses the WWN of the actual target. The virtual target receives the frame from the initiator, and sends the frame to the actual target with a virtual initiator, which uses the WWN of the actual initiator. In contrast to virtualization, where an initiator issues a frame to a virtual target that uses its own WWN in a switch, frame redirection allows an initiator to issue a frame to the actual target. Frame redirection allows for data services including, for example, mirroring, migration, snapshot, replication, and journaling, etc., without having to worry about when devices change (e.g., are replaced) on a fabric. These data services, referred to as translation operations, are discussed more fully, for example, in U.S. patent application Ser. No. 10/695,408, the contents of which are incorporated by reference.

Figure 1A:
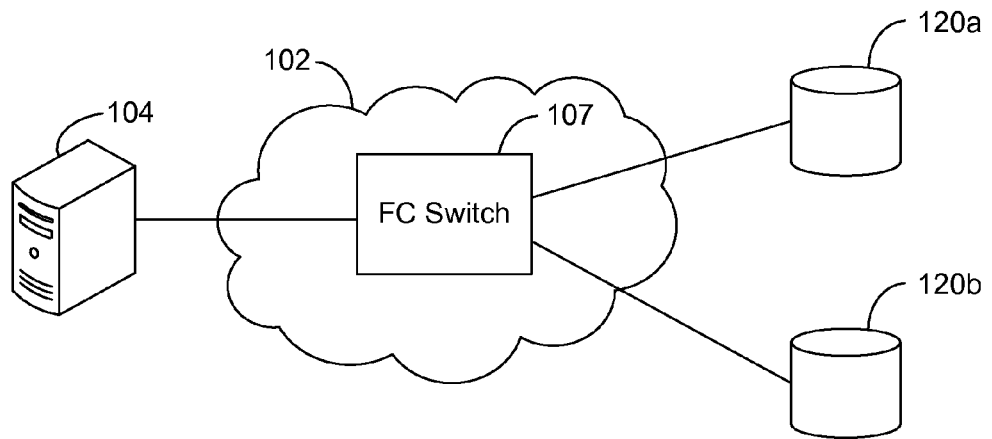
FIG. 1A is a schematic representation of a prior art network.
Figure 1B:
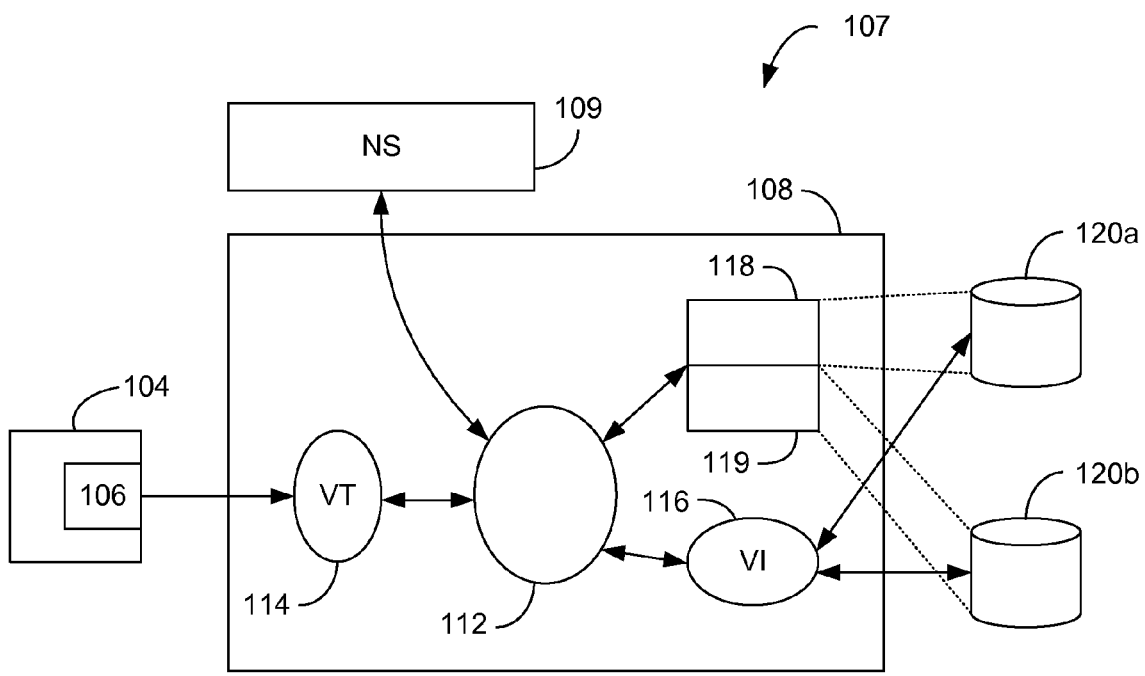
FIG. 1B is a schematic representation of a prior art network enabling virtualization.
Figure 2A:
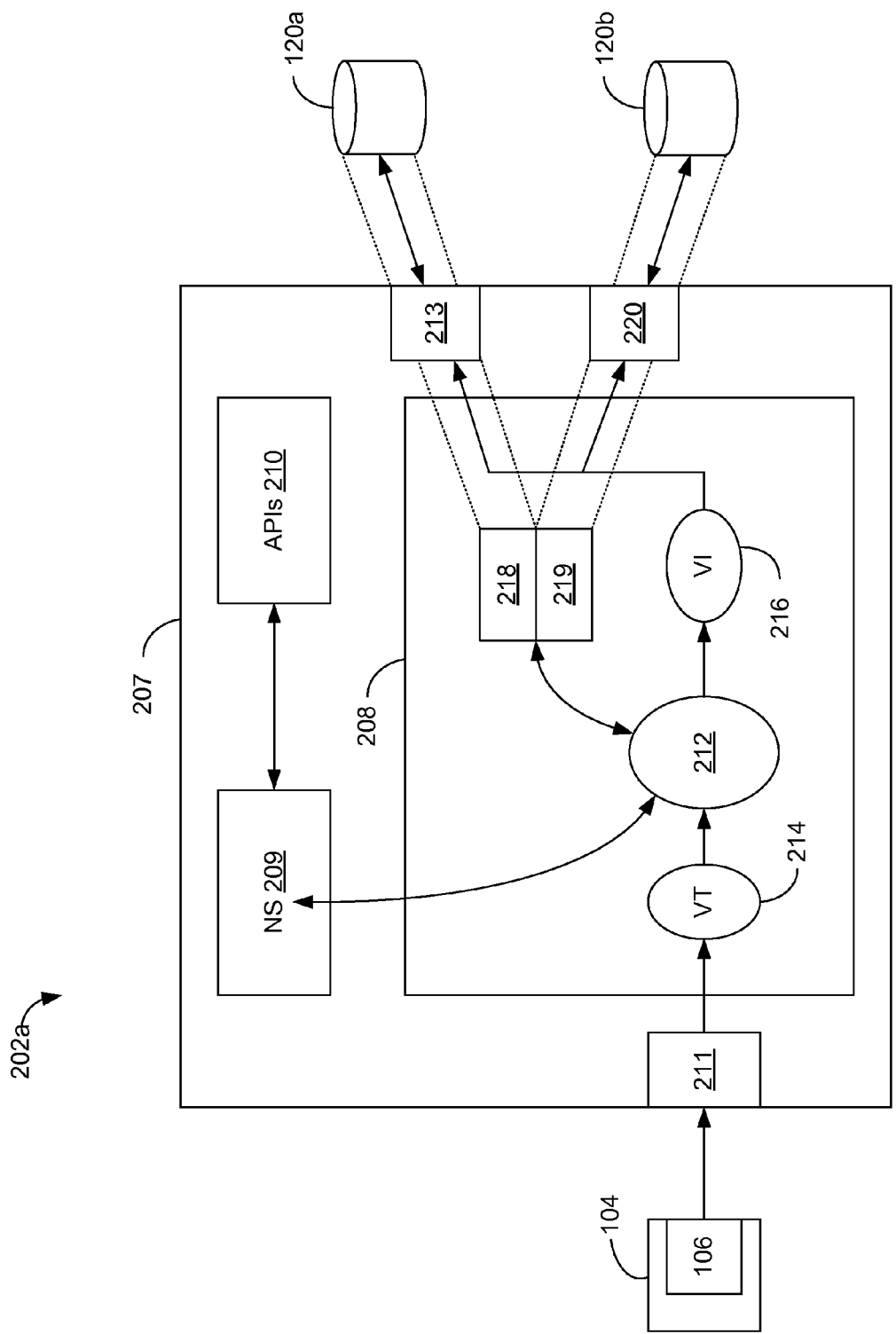
FIG. 2A is a first logical representation of a network enabling frame redirection according to an embodiment of the invention.

FIG. 2A illustrates a fabric 202 having a redirection switch 207 in accordance with a first embodiment of the invention. The redirection switch 207 includes a redirection processor 208. Because of the need to perform inline operations, the redirection processor 208 preferably is formed of a general purpose processor to perform control level operations and dedicated hardware or network processors, or both, to handle the inline operations. Examples include designs such as those disclosed in U.S. patent application Ser. No. 10/695,408 and U.S. Pat. No. 7,120,728, both of which are hereby incorporated by reference. The switch 207 is connected, via a fabric, to a host 104 and to the storage devices 120a, 120b. Also in the switch 207 is a name server 209, which performs specific functions related to frame redirection, discussed in detail below. Additionally, the switch 207 includes redirection application programming interfaces (APIs) 210, which are called by various devices in the switch 207.

When a host 104 uses frame redirection to send a frame to a target, the host sends the frame to a virtual target 214 in the redirection switch 207, believing that the virtual target 214 in the redirection switch 207 is actually the target (e.g., storage device 120a) due to the use of the WWN of the actual target. Thus, the frame is passed from the HBA 106 to the port 211. When the redirection switch 207 has processed the frame, it is passed from a port (e.g., 213, 220) to the intended or actual target (e.g., storage device 120a). Thus, as seen in FIG. 2, the ports 211, 213, 220 of the redirection switch 207 link initiators (e.g., host devices) to targets (e.g., storage devices).

In the redirection processor 208, a received frame is passed from a port 211 to a virtual target 214. From the virtual target 214, a volume manager 212 provides mappings from logic units 218, 219 to the appropriate physical target (e.g., 120a). The frame is passed to the virtual initiator 216, which sends the frame to the appropriate physical target (e.g., 120a) via the corresponding port (e.g., 213). To the physical target, the frame appears to have been sent by the host 104, even though it was sent by the virtual initiator 216.

Figure 2B:
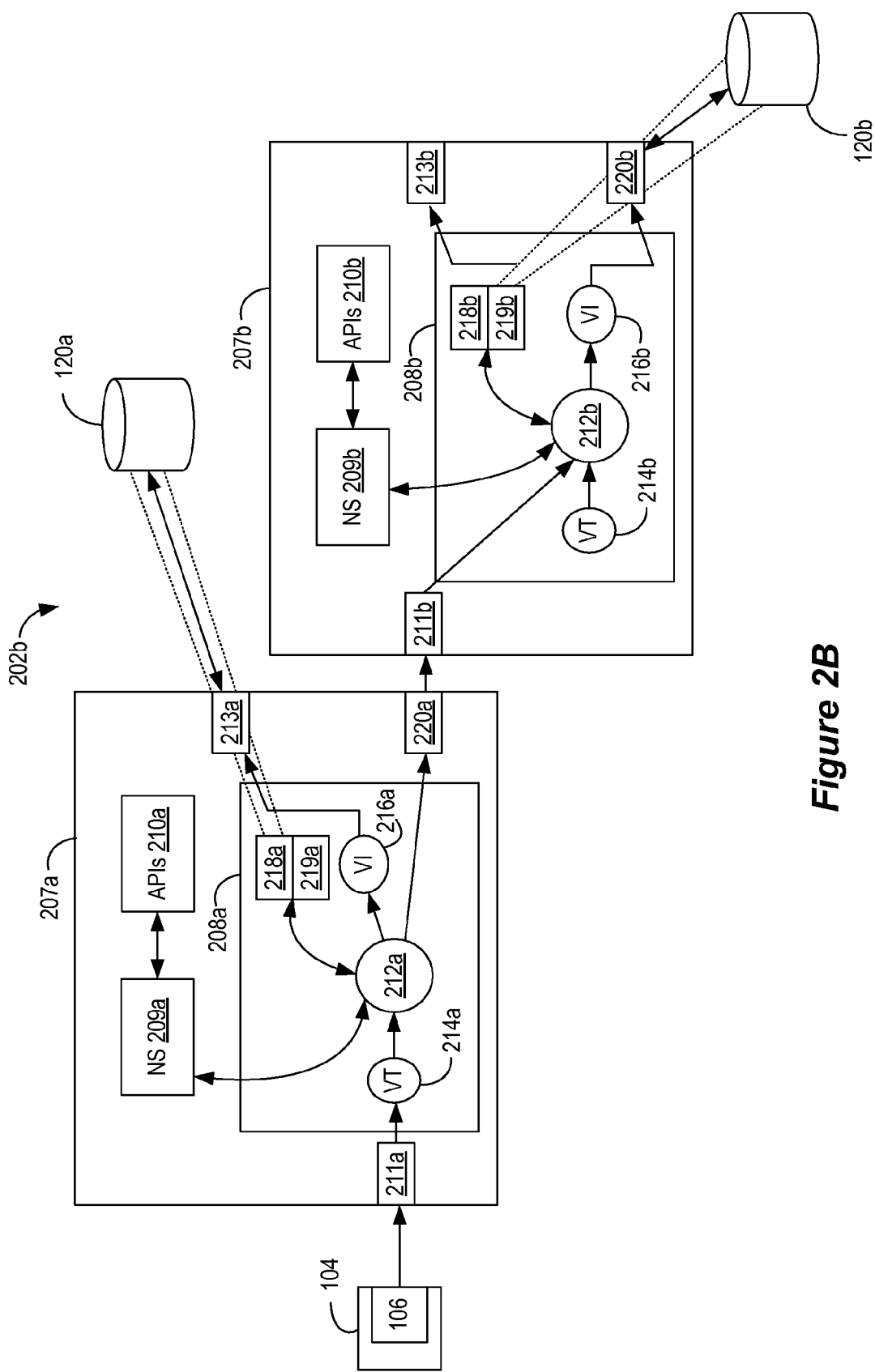
FIG. 2B is a second logical representation of a network enabling frame redirection according to an embodiment of the invention.

FIG. 2B illustrates a fabric 202b in accordance with a second embodiment of the invention. In this embodiment there are two redirection switches 207a, 207b, both of which operate similarly to redirection switch 207, with the elements of switch 207 renumbered as a and b for redirection switches 207a, 207b, respectively. FIG. 2B illustrates the case where one storage device 120a is connected to redirection switch 207a and another storage device 120b is connected to redirection switch 207b. The volume manager 212a maps the storage device 120a as before through virtual initiator 216a, but maps the storage device 120b through the virtual initiator 216b in redirection switch 207b. For frames redirected to storage device 120b, the frames are sent from redirection switch 207a to redirection switch 207b without use of virtual initiator 216a. The virtual initiator 216b handles the communication with the storage device 120b. In this embodiment the virtual targets 214a, 214b and virtual initiators 216a, 216b have their own WWNs, allowing direct communication to the virtual targets and virtual initiators if desired as shown in FIG. 2B. When communications between the host 104 and the storage devices 120a, 120b are performed however, the virtual initiators 216a, 216b utilize the WWNs of the physical initiator 106 and the virtual target 214a uses the WWN of the storage device 120a.

FIGS. 2A and 2B illustrate using volume mapping as part of the redirection process. This is used with cases like mirroring as shown in FIGS. 2A and 2B. If operations only requiring the original target drive are being performed, such as encryption, no volume mapping is required.

Figure 2C:
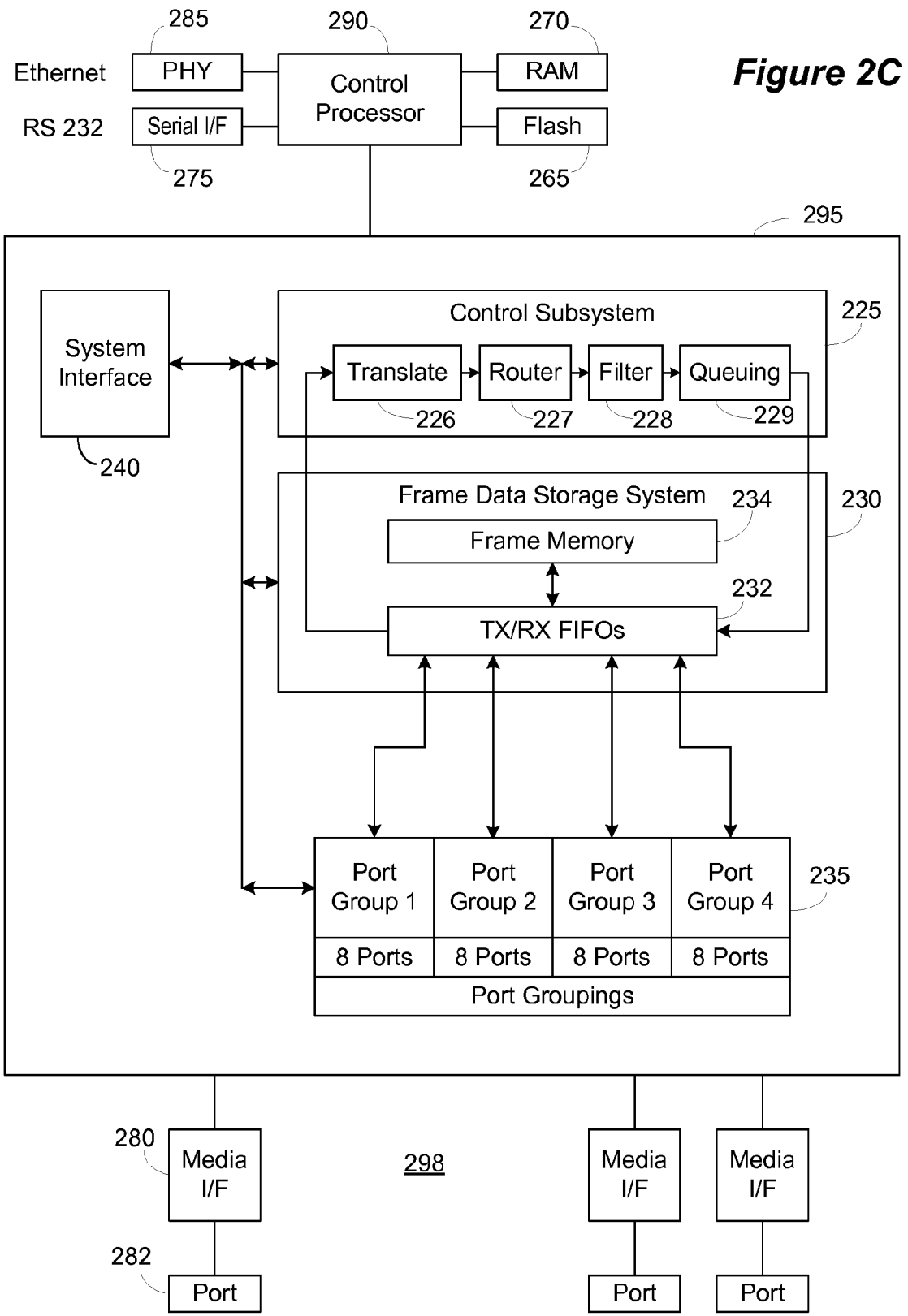
FIG. 2C is a block diagram of a network device enabling frame redirection according to an embodiment of the invention.

FIG. 2C is a block diagram of an exemplary switch 298 which can form the redirection switch 207. A control processor 290 is connected to a switch ASIC 295. The switch ASIC 295 is connected to media interfaces 280 which are connected to ports 282. The ports 282 correspond generally to ports 211, 213 and 220. Generally the control processor 290 configures the switch ASIC 295 and handles higher level switch 207 operations, such as the name server, the redirection requests, and the like. The switch ASIC 295 handles the general high speed inline or in-band operations, such as switching, routing and frame translation. The control processor 290 is connected to flash memory 265 to hold the software, to RAM 270 for working memory and to an Ethernet PHY 285 and serial interface 275 for out-of-band management.

The switch ASIC 295 has four basic modules, port groups 235, a frame data storage system 230, a control subsystem 225 and a system interface 240. The port groups 235 perform the lowest level of packet transmission and reception. Generally, frames are received from a media interface 280 and provided to the frame data storage system 230. Further, frames are received from the frame data storage system 230 and provided to the media interface 280 for transmission out a port 282. The frame data storage system 230 includes a set of transmit/receive FIFOs 232, which interface with the port groups 235, and a frame memory 234, which stores the received frames and frames to be transmitted. The frame data storage system 230 provides initial portions of each frame, typically the frame header and a payload header for FCP frames, to the control subsystem 225. The control subsystem 225 has translate 226, router 227, filter 228 and queuing 229 blocks. The translate block 226 examines the frame header and performs any necessary address translations, such as those which will happen when a frame is redirected as described herein. There can be various embodiments of the translation block 226, with examples of translation operation provided in U.S. patent application Ser. No. 10/695,408 and U.S. Pat. No. 7,120,728, both of which were referenced above. Those examples also provide examples of the control/data path splitting of operations. The router block 227 examines the frame header and selects the desired output port for the frame. The filter block 228 examines the frame header, and the payload header in some cases, to determine if the frame should be transmitted. In the preferred embodiment hard zoning is accomplished using the filter block 228. The queuing block 229 schedules the frames for transmission based on various factors including quality of service, priority and the like.

This is one embodiment for performing the required frame translations and routing to accomplish frame redirection as described herein. Other embodiments and different architectures can be used.

Figure 3:
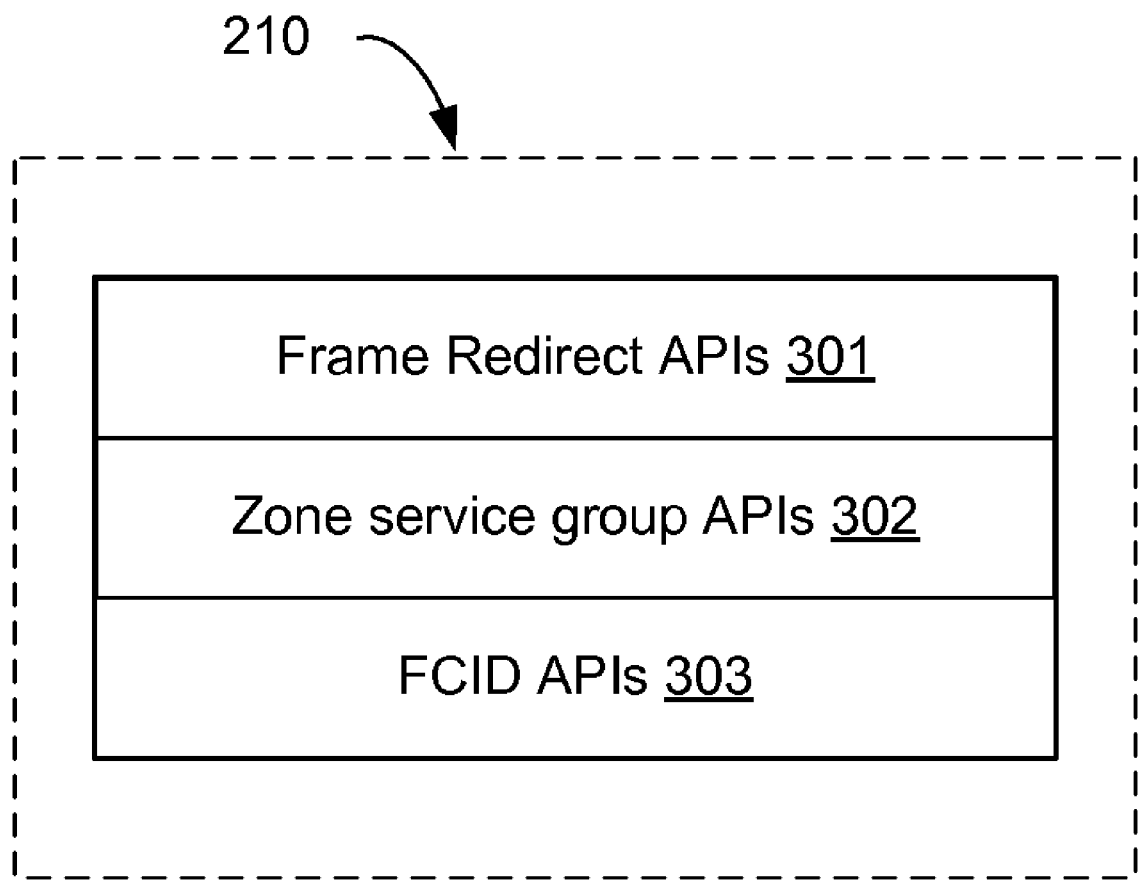
FIG. 3 is a schematic representation of frame redirection application programming interfaces (APIs) according to an embodiment of the invention.

As shown in FIG. 3, redirection APIs 210 include various APIs to perform tasks related to frame redirection in a fabric. More specifically, the redirection APIs 210 include frame redirect APIs 301, zone service group APIs 302, and Fibre Channel identification (FCID) APIs 303. These APIs are used by management functions, either internal or external to the switch 207, to manage the redirection operations. The frame redirect APIs 301 enable the switch 207 to configure the frame redirect feature. These APIs are configured to associate and disassociate a physical target and virtual target, to activate a virtual target in frame redirect mode and also to expose the virtual target. Further, the redirect APIs 301 are configured to associate and disassociate a physical target (e.g., 120*a*) to and from a virtual initiator (e.g., 216).

The zone service group APIs 302 are used to perform functions related to setting and clearing redirect group zones, explained in detail below. These APIs are configured to add or remove a redirect group zone. More specifically, the zone service group APIs 302 commit added redirect group zones, commit defined redirect group zones to the name server 209, and query to the name server 209 for redirect group zones.

The FCID APIs 303 are used to set FCIDs to the virtual target 214 and the virtual initiator 216 due to the use of the initiator's WWN by the virtual initiator 216. These APIs allow a user to set an FCID index for the virtual initiator 214 or the virtual target 216 at a data path controller for which the index is to be used. These indexes are used during fabric login (FLOGI) operations. In general, the indexes are set for all of the virtual entities or for none of the virtual entities, as setting indexes for only some of the virtual entities may lead to failures when attempting to register a virtual initiator or a virtual target.

In order to perform frame redirection, special redirect group zones are created to group the logical entities that need to communicate with each other. Such a redirect group zone includes identification for an initiator and a target on the fabric, as well as a virtual initiator and a virtual target on the redirection switch. It is important to note that a redirect group zone is not a zone in the typical sense of a SAN; rather, a redirect group zone changes the manner in which an initiator (e.g., host 104) and a target (e.g., storage device 120*a*) communicate. Once a redirect group zone is defined, traffic from an initiator to a target will be routed through the redirection switch having the virtual initiator and the virtual target corresponding to the redirect group zone.

Two separate redirection policies may be created, referred to as restartable and non-restartable policies. A restartable policy allows initiator and target traffic to pass freely, regardless of whether the redirection switch is operating. Such a policy is useful when downtime is not acceptable between an initiator and a target (e.g., when data migration is used). In contrast, a non-restartable policy requires both the virtual initiator and the virtual target to be operating for traffic to pass between the initiator and the target. Such a policy is useful when an initiator should not communicate with a target without the information first passing through the redirection switch (e.g., when data must be encrypted or decrypted). Once created, the redirect group zones created having these policies are propagated to other switches in a fabric and are enforced by each name server in each switch.

Figure 4:
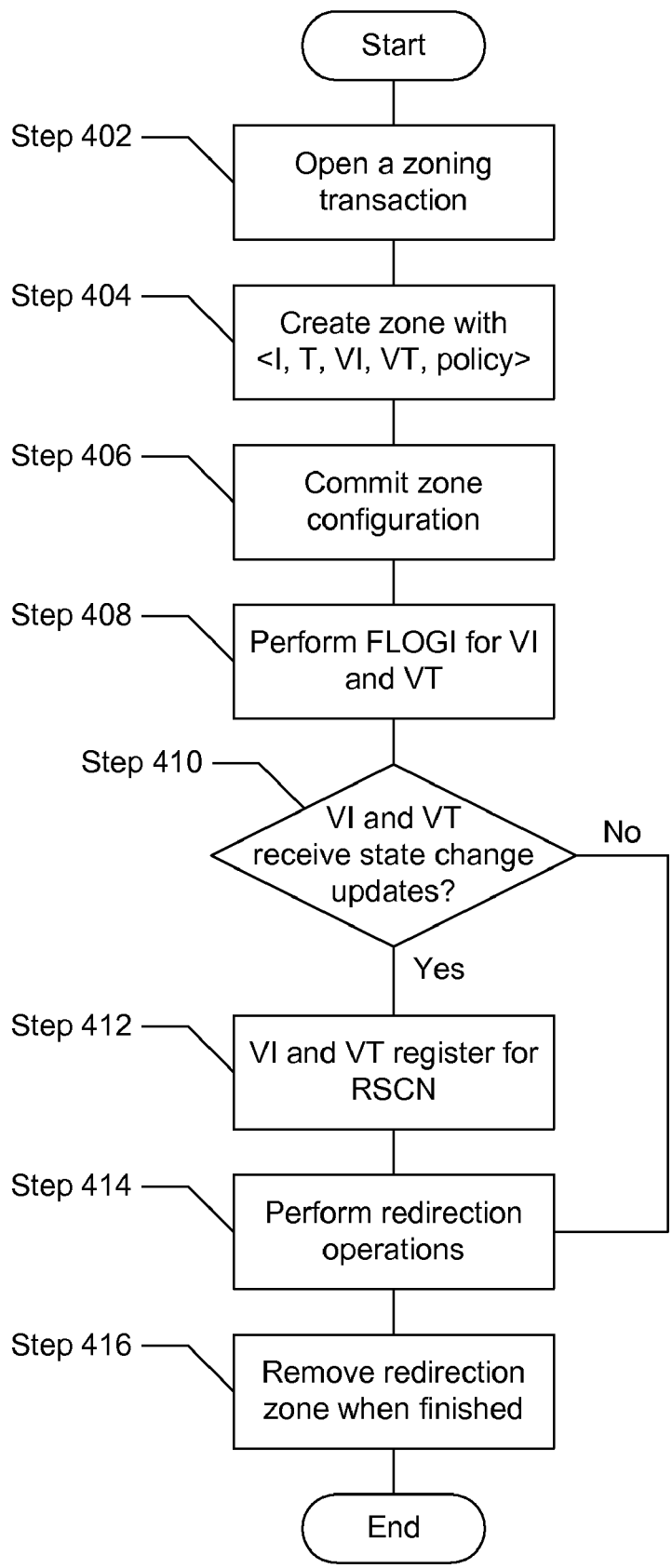
FIG. 4 is a flow chart showing a process by which frame redirection zoning occurs according to an embodiment of the invention.

FIG. 4 shows how frame redirection zoning occurs according to an embodiment of the invention (i.e., how a redirect group zone is created). In Step 402, the switch opens a zoning transaction by calling a zone service group API 302. A special redirect group zone is created (Step 404), which contains the WWNs of the initiator, target, virtual initiator, and virtual target, as well as a policy for the zone. It should be apparent from the basis of this disclosure that the initiator and the virtual initiator will have identical WWNs, and that the target and the virtual target will also have identical WWNs. Then, the zone configuration is committed (Step 406) by calling another zone service group API 302. To activate the virtual initiator and the virtual target in the switch, a FLOGI operation is performed (Step 408). In an alternative embodiment the FLOGI operation for the virtual initiator and the virtual target can be performed prior to creating the zone (Step 404). If the virtual initiator and the virtual target are to receive notifications of device changes in the fabric (Step 410), the switch registers the virtual initiator and the virtual target RSCNs (Step 412). Otherwise, or when the RSCNs are complete, redirection operations may be performed (Step 414). In other words, Fibre Channel traffic may pass from an initiator to a target using frame redirection. Finally, when the frame redirection is finished, the redirection zone is removed by the redirection switch (Step 416).

Alternatively, a graphical user interface (GUI) tool could be used to specify the relevant devices. The various physical initiators and targets can be displayed. The user can then select the desired initiator, which provides the initiator and virtual initiator WWNs and the initiator PID, with the virtual initiator PID being assigned so that frames are directed to the switch 207; the target whose frames are to be redirected, which provides the target and virtual target WWNs, the virtual target PID being assigned so that frames are directed to the switch 207; and the target which is the destination of the redirected frames, which provides the target PID. From these selected devices, the redirect group is created and provided to the name server. Operation would then proceed at step 406.

Figure 5:
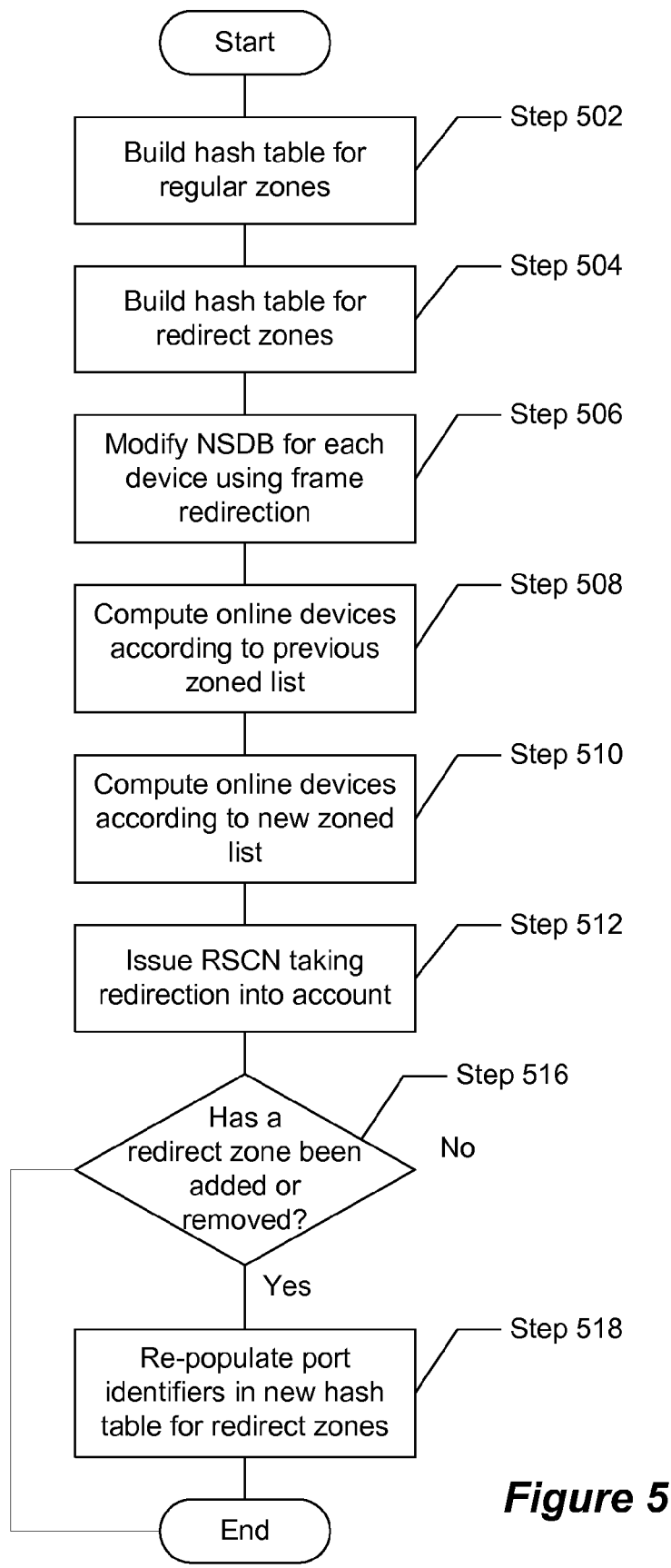
FIG. 5 is a flow chart showing a process by which frame redirection zoning occurs according to an embodiment of the invention.

FIG. 5 shows a flow chart illustrating additional operations that occur when a zone is created in a switch. At the time of the zone change (i.e., creation or removal of a redirect group zone), a hash table is created for regular zones (Step 502) and redirect group zones (Step 504). The creation of a hash table for regular zones is similar to hash tables that are presently created. However, a separate hash table is created for any redirect group zones that are present. As the hash tables are being created, device entries in the name server database (NSDB) are modified such that each device involved in frame redirection is noted (e.g., flagged through modification of a redirect attribute) (Step 506). A list of online devices before and after the zoning change is computed (Steps 508 and 510), so that an RSCN may be issued (e.g., by comparing zoned lists before and after the zoning change) (Step 512), so that the relevant hosts and targets can query the name server to obtain the new FCID for the devices. In this case, the host will receive the FCID of the virtual target and the target will receive the FCID of the virtual initiator. Because this is done simply by using an RSCN, no normal zones or ACLs must be modified and none of the devices must re-scan the fabric for new devices. If a redirect group zone has been added or removed (Step 516), then the hash table for the redirect group zone is modified as necessary to reflect the port identifiers of the devices in the newly added or removed redirect group zone (Step 518).

Figure 6:
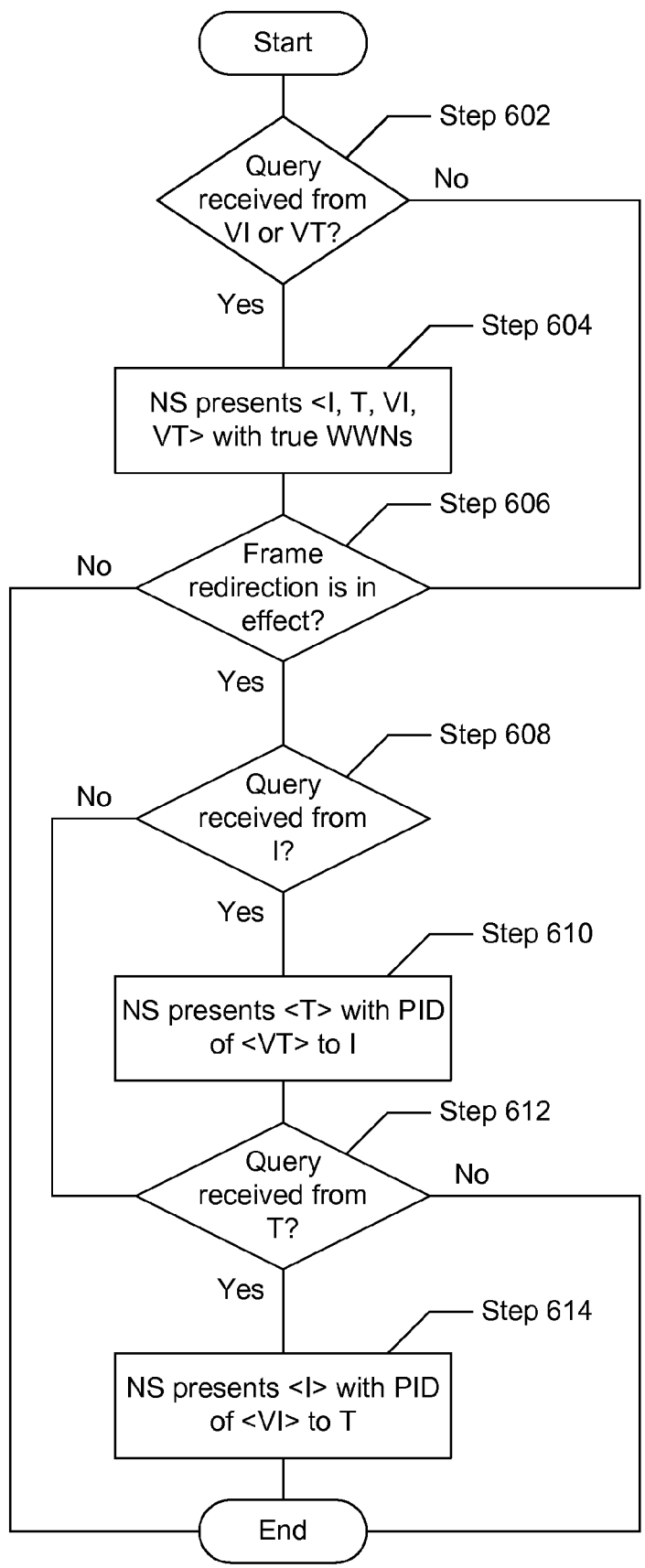
FIG. 6 is a flow chart showing a process by which frame redirection querying occurs according to an embodiment of the invention.

Once a redirect group zone is created and committed, frame redirection may be used. FIG. 6 shows a flow chart illustrating how frame redirection querying occurs according to an embodiment of the invention. This occurs, for example, when an initiator attempts to establish a session with a target (e.g., when an initiator attempts to send a Fibre Channel frame to a target on a fabric). When a redirection switch determines that a virtual device in a particular redirection group (i.e., a virtual target or a virtual initiator) has issued a query (Step 602), the name server (e.g., name server 209) returns the true WWNs and port identifiers of the initiator or the target in that redirection group to the device (Step 604).

Otherwise, as long as frame redirection is in effect (Step 606), the output from the name server is dependent on whether an initiator or a target issues a query. The name server stores the WWNs of redirection groups. When a query is received by an initiator (Step 608) in a redirection group, the initiator attempts to obtain the port identifier for the target, using the WWN of the target. Using frame redirection, the name server returns the WWN of the target with the port identifier of the virtual target (Step 610). In this manner, when a frame is sent from an initiator to a target, the initiator will use the port identifier of the virtual target and the redirection frame will be redirected to the virtual target. Similarly, when a query is received by a target (Step 612), the name server returns the WWN of the initiator with the port identifier of the virtual initiator (Step 614). In other words, when the name server returns a WWN to a host that is the WWN for the virtual target, the WWN is the same as a WWN for the target. Similarly, when the name server returns a WWN to a target, the WWN for the virtual initiator is the same as a WWN for the host.

Frame redirection may be best understood by way of describing the path of an example frame, on which a translation operation is performed, with reference to FIG. 2. Translation operations include, for example, mirroring, migration, snapshot, replication, and journaling. These operations are discussed more fully, for example, in U.S. patent application Ser. No. 10/695,408, the contents of which are incorporated by reference. In this example, data mirroring will be used.

In FIG. 2, an example frame is sent by the host 104, to pass from the host 104 to the storage device 120a. In this process, the initiator (host 104) issues a command to the physical target, which is storage device 120a. Before the frame is sent, the host queries the switch 207 to obtain the WWN of the target (storage device 120a). The name server 209 provides the initiator with the WWN of the target 120a and the port identifier of the virtual target 214. Thus, when the host 104 sends the frame, the frame is redirected to the virtual target 214 in the switch 207, which applies any necessary storage application logic. In other words, data mirroring is used to back up the data on the storage device 120b. The frame is passed from the virtual target 214 to the virtual initiator 216 and a redirected frame is created. The virtual initiator 216 sends the redirected frame to the storage device 120a from the switch 207 using the initiator identity (i.e., that of the host 104), but with the virtual initiator port identifier. A copy of the redirected frame is also sent to the storage device 120b, using the initiator identity as just described. Similar operations, but with exchanged devices, are performed when a target queries the switch 208 for the WWN and port identifier of an initiator.

The above description assumes that the redirection is already initialized before the host or target query the switch. If the host and target are already connected, the administrator develops the redirection and its related virtual targets, virtual initiators, and redirect zones as described above. In the final step, effectively, when the redirection is made active, the switch 207 sends RSCNs (effectively from the host and the target) causing each device to reacquire the port identifiers of the other devices. The switch 207 captures these requests as described above and the virtual target and virtual initiator are effectively inserted into a path between the host and target without any additional administrator actions, as no main zones need to be changed, no ACLs need to be recreated, and no devices need to be disconnected, reconnected, or otherwise forced to re-scan the fabric. In summary, an online insertion can be performed in a simple and efficient manner.

Advantages of the invention include one or more of the following. One or more embodiments according to the invention enable storage application services to be enabled without requiring any host or target reconfiguration.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method for processing a frame sent from a host device acting as an initiator and having a first world wide name (WWN) and a first address to a storage unit acting as a target and having a second WWN and a second address, comprising:
   receiving the frame from the host device at a virtual target in a redirection device, the virtual target having said second WWN and a third address;
   translating the received frame into a redirected frame in the redirection device; and
   sending the redirected frame from a virtual initiator in the redirection device to the storage unit, the virtual initiator having said first WWN and a fourth address.

2. The method of claim 1, wherein translating comprises performing at least one of mirroring, snapshotting, journaling, and migration.

3. The method of claim 1, wherein the host, the storage unit, the virtual target, and the virtual initiator are part of a redirect group zone.

4. The method of claim 3, wherein the redirect group zone comprises a restartable policy, wherein a restartable policy allows initiator and target traffic to pass freely, regardless of whether the virtual initiator and virtual target are operating.

5. The method of claim 3, wherein the redirect group zone comprises a non-restartable policy, wherein a non-restartable policy requires both the virtual initiator and the virtual target to be operating for traffic to pass between the initiator and the target.

6. The method of claim 3, further comprising:
   providing the host device with said second WWN and said third address of the virtual target before the frame is received; and
   providing the storage unit with said first WWN and said fourth address of the virtual initiator before the frame is received.

7. The method of claim 1, further comprising:
   providing the host device with said second WWN and said third address of the virtual target before the frame is received; and
   providing the storage unit with said first WWN and said fourth address of the virtual initiator before the frame is received.

8. A method for redirecting a frame from a host intended for a storage unit, the host having a first World Wide Name (WWN) and a first address and the storage unit having a second WWN and a second address, the method comprising:
   organizing the host, the storage unit, a virtual target, and a virtual initiator as a group;
   returning said second WWN and a third address of the virtual target if the host queries for the storage unit; and
   returning said first WWN and a fourth address of the virtual initiator if the storage unit queries for the host.

9. The method of claim 8, further comprising:
   returning said first WWN and said first address if the virtual target queries for the host; and
   returning said second WWN and said second address if the virtual initiator queries for the storage unit.

10. The method of claim 8, wherein the host, the storage unit, the virtual target, and the virtual initiator are organized as a redirect group zone.

11. The method of claim 8, wherein the method is performed using a name server in a switch.

12. A redirection device for processing frames containing source and destination addresses and data, the frames sent between a host device acting as an initiator and having a first world wide name (WWN) and a storage unit acting as a target and having a second WWN on a network comprising a fabric, the redirection device comprising:
- at least one port for coupling to the host device and to the storage unit;
- a virtual target coupled to said at least one port for receiving frames from and providing frames to the host device;
- a virtual initiator coupled to said at least one port and said virtual target for receiving frames from and providing frames to the storage unit;
- a memory storing information related to each of the host device, the storage unit, the virtual target, and the virtual initiator, wherein the information includes a WWN and an address for each of the host device, the storage unit, the virtual target, and the virtual initiator; wherein the WWN for the virtual target is the same as the WWN for the target and the WWN for the virtual initiator is the same as the WWN for the host device; and wherein the address is different for each of the host device, the storage unit, the virtual target, and the virtual initiator; and
- a translator coupled to the at least one port for translating addresses in frames containing host device and virtual target addresses to virtual initiator and storage unit addresses and in frames containing virtual initiator and storage unit addresses to host device and virtual initiator addresses,
- wherein the virtual target provides frames received from the host device to the virtual initiator which provides the frames to the storage unit, and
- wherein the virtual initiator provides frames received from the storage unit to the virtual target which provides the frames to the host device.

13. The device of claim 12, wherein the redirection device further comprises a name server and the memory is a portion of the name server.

14. The device of claim 12, wherein the host, the storage unit, the virtual target and the virtual initiator are part of a redirect group zone.

15. A network, comprising:
- a host device acting as an initiator and having a first world wide name (WWN);
- a storage unit acting as a target and having a second WWN; and
- a fabric connected to and coupling the host device and the storage unit, comprising:
  - a redirection device for processing frames containing source and destination addresses and data, the frames sent between the host device and the storage unit, the redirection device including:
    - at least one port coupled to the host device and to the storage unit;
    - a virtual target coupled to the at least one port for receiving frames from and providing frames to the host device;
    - a virtual initiator coupled to the at least one port and the virtual target for receiving frames from and providing frames to the storage unit;
    - a memory storing information related to each of the host device, the storage unit, the virtual target, and the virtual initiator, wherein the information includes a WWN and an address for each of the host device, the storage unit, the virtual target, and the virtual initiator; wherein the WWN for the virtual target is the same as the WWN for the target and the WWN for the virtual initiator is the same as the WWN for the host device; and wherein the address is different for each of the host device, the storage unit, the virtual target, and the virtual initiator; and
    - a translator coupled to the at least one port for translating addresses in frames containing host device and virtual target addresses to virtual initiator and storage unit addresses and in frames containing virtual initiator and storage unit addresses to host device and virtual initiator addresses,
    - wherein the virtual target provides frames received from the host device to the virtual initiator which provides the frames to the storage unit, and
    - wherein the virtual initiator provides frames received from the storage unit to the virtual target which provides the frames to the host device.

16. The network of claim 15, wherein the redirection device further comprises a name server and the memory is a portion of the name server.

17. The network of claim 15, wherein the host, the storage unit, the virtual target and the virtual initiator are part of a redirect group zone.

18. A method comprising:
- receiving a frame from an initiator at a virtual target in a redirection device, the initiator having a first world wide name (WWN) and a first address and the virtual target having a second WWN and a third address;
- translating the received frame into a redirected frame in the redirection device; and
- sending the redirected frame from a virtual initiator in the redirection device to a target, the target having said second WWN and a second address and the virtual initiator having said first WWN and a fourth address.

19. The method of claim 18, wherein the host, the storage unit, the virtual target, and the virtual initiator are part of a redirect group zone.

20. The method of claim 19, wherein the redirect group zone comprises a restartable policy, wherein a restartable policy allows initiator and target traffic to pass freely, regardless of whether the virtual initiator and virtual target are operating.

21. The method of claim 19, wherein the redirect group zone comprises a non-restartable policy, wherein a non-restartable policy requires both the virtual initiator and the virtual target to be operating for traffic to pass between the initiator and the target.

22. The method of claim 18, further comprising:
- providing the initiator with said second WWN and said third address of the virtual target before the frame is received; and
- providing the target with said first WWN and said fourth address of the virtual initiator before the frame is received.

23. A method comprising:
- organizing a host, a storage unit, a virtual target, and a virtual initiator as a group, the host having a first World Wide Name (WWN) and a first address and the storage unit having a second WWN and a second address;
- returning said second WWN and a third address of the virtual target if the host queries for the storage unit; and
- returning said first WWN and a fourth address of the virtual initiator if the storage unit queries for the host.

24. The method of claim 23, further comprising:
- returning said first WWN and said first address if the virtual target queries for the host; and
- returning said second WWN and said second address if the virtual initiator queries for the storage unit.

25. The method of claim 23, wherein the host, the storage unit, the virtual target, and the virtual initiator are organized as a redirect group zone.

26. A redirection device, comprising:
- at least one port for coupling to a host device and to a storage unit, the host device acting as an initiator and having a first world wide name (WWN) and the storage unit acting as a target and having a second WWN;
- a virtual target coupled to said at least one port for receiving frames from and providing frames to the host device;
- a virtual initiator coupled to said at least one port and said virtual target for receiving frames from and providing frames to the storage unit;
- a memory storing information related to each of the host device, the storage unit, the virtual target, and the virtual initiator, wherein the information includes a WWN and an address for each of the host device, the storage unit, the virtual target, and the virtual initiator; wherein the WWN for the virtual target is the same as the WWN for the target and the WWN for the virtual initiator is the same as the WWN for the host device; and wherein the address is different for each of the host device, the storage unit, the virtual target, and the virtual initiator; and
- a translator coupled to the at least one port for translating addresses in frames containing host device and virtual target addresses to virtual initiator and storage unit addresses and in frames containing virtual initiator and storage unit addresses to host device and virtual initiator addresses,
- wherein the virtual target provides frames received from the host device to the virtual initiator which provides the frames to the storage unit, and
- wherein the virtual initiator provides frames received from the storage unit to the virtual target which provides the frames to the host device.

27. The device of claim 26, wherein the redirection device further comprises a name server and the memory is a portion of the name server.

28. The device of claim 26, wherein the host, the storage unit, the virtual target and the virtual initiator are part of a redirect group zone.

29. A network, comprising:
- a host device acting as an initiator and having a first world wide name (WWN);
- a storage unit acting as a target and having a second WWN; and
- a fabric connected to and coupling the host device and the storage unit, comprising:
- a redirection device for processing frames containing source and destination addresses and data, the frames sent between the host device and the storage unit, the redirection device including:
  - at least one port coupled to the host device and to the storage unit;
  - a virtual target coupled to the at least one port for receiving frames from and providing frames to the host device;
  - a virtual initiator coupled to the at least one port and the virtual target for receiving frames from and providing frames to the storage unit;
  - a memory storing information related to each of the host device, the storage unit, the virtual target, and the virtual initiator, wherein the information includes a WWN and an address for each of the host device, the storage unit, the virtual target, and the virtual initiator; wherein the WWN for the virtual target is the same as the WWN for the target and the WWN for the virtual initiator is the same as the WWN for the host device; and wherein the address is different for each of the host device, the storage unit, the virtual target, and the virtual initiator; and
  - a translator coupled to the at least one port for translating addresses in frames containing host device and virtual target addresses to virtual initiator and storage unit addresses and in frames containing virtual initiator and storage unit addresses to host device and virtual initiator addresses,
- wherein the virtual target provides frames received from the host device to the virtual initiator which provides the frames to the storage unit, and
- wherein the virtual initiator provides frames received from the storage unit to the virtual target which provides the frames to the host device.

30. The network of claim 29, wherein the redirection device further comprises a name server and the memory is a portion of the name server.

31. The network of claim 29, wherein the host, the storage unit, the virtual target and the virtual initiator are part of a redirect group zone.

* * * * *